United States Patent
Depeyrot et al.

(10) Patent No.: US 10,223,290 B2
(45) Date of Patent: Mar. 5, 2019

(54) PROCESSING DEVICE WITH SENSITIVE DATA ACCESS MODE

(71) Applicant: DOLPHIN INTEGRATION, Meylan (FR)

(72) Inventors: Gilles Depeyrot, Claix (FR); Olivier Monfort, Grenoble (FR)

(73) Assignee: Dolphin Integration, Meylan (FR)

( * ) Notice: Subject to any disclaimer, the term of this patent is extended or adjusted under 35 U.S.C. 154(b) by 12 days.

(21) Appl. No.: 15/425,877

(22) Filed: Feb. 6, 2017

(65) Prior Publication Data
US 2017/0228326 A1   Aug. 10, 2017

(30) Foreign Application Priority Data
Feb. 10, 2016 (FR) ................................ 16 51065

(51) Int. Cl.
*G06F 12/14* (2006.01)
*G06F 9/38* (2018.01)

(52) U.S. Cl.
CPC ........ *G06F 12/1425* (2013.01); *G06F 9/3802* (2013.01); *G06F 12/1408* (2013.01); *G06F 2212/402* (2013.01)

(58) Field of Classification Search
CPC .. G06F 12/1425; G06F 12/1491; G06F 21/53; G06F 2212/1052; G06F 2221/2149; G06F 12/1325; G06F 12/1408; G06F 9/3802; G06F 2212/402; H04L 63/105
See application file for complete search history.

(56) References Cited

U.S. PATENT DOCUMENTS

| | | | | |
|---|---|---|---|---|
| 6,968,459 | B1* | 11/2005 | Morgan | G06F 12/1408 711/E12.092 |
| 2004/0034875 | A1* | 2/2004 | Bulkowski | H04N 7/088 725/136 |
| 2004/0177261 | A1 | 9/2004 | Watt et al. | |
| 2006/0218425 | A1 | 9/2006 | Ding et al. | |
| 2013/0205403 | A1* | 8/2013 | Grocutt | G06F 21/52 726/27 |

(Continued)

FOREIGN PATENT DOCUMENTS

| | | |
|---|---|---|
| WO | 2006093618 A2 | 9/2006 |
| WO | 2007030524 A1 | 3/2007 |

OTHER PUBLICATIONS

French National Institute of Industrial Property, Search Report for FR 16/51065, dated Feb. 10, 2006.

(Continued)

*Primary Examiner* — Hiep T Nguyen
(74) *Attorney, Agent, or Firm* — Kevin R. Erdman; Brannon Sowers & Cracraft PC (57) ABSTRACT

The present invention concerns a method of protecting sensitive data, and a corresponding computing system processing device, comprising: entering, by a processing device, a sensitive date access mode in-which sensitive data is accessible; restricting, by a program running in the sensitive data access mode, one or more accessible address ranges for a non-secure function, and calling, from the sensitive data access mode, the non-secure function; and entering, by the processing device, a further operating mode to execute the non-secure function during which the processing device has access to only the one or more accessible address ranges.

15 Claims, 2 Drawing Sheets

(56) References Cited

U.S. PATENT DOCUMENTS

2015/0195106 A1* 7/2015 Sehr .................... G06F 12/1458
709/206

OTHER PUBLICATIONS

Tzi-Cker Chiueh et al, "Integrating segmentation and paging protection for safe, efficient and transparent software extensions", Operating Systems Review, ACM, New York, NY, US, vol. 33, No. 5; Dec. 12, 1999, pp. 140-153; XP058133050, ISSN: 0163-5980, DOI: 10.1145/319344.319161, p. 140-151.

Michael D. Schroeder and Jerome H. Saltzer, "A Hardware Architecture for Implementing Protection Rings", Communications of the ACM, Mar. 1972, vol. 15 No. 3 (Presented at the Third ACM Symposium on Operating Systems Principles, Palo Alto, California, Oct. 18-20, 1971).

* cited by examiner

PROCESSING DEVICE WITH SENSITIVE DATA ACCESS MODE

CROSS-REFERENCE TO RELATED APPLICATIONS

The present application claims priority under 35 U.S.C. § 119(e) of French Patent application number 16/51065, filed on Feb. 10, 2016, the disclosures of which are incorporated by reference herein.

BACKGROUND OF THE INVENTION

Field of the Invention

The present disclosure relates to the field of computing systems having privileged operating modes, and in particular to a processing device having a sensitive data access mode.

It is known to provide computing systems with operating modes having different levels of privilege. For example, a computing system may be capable of operating in a supervisor mode in which all or most operations are permitted, including the modification of certain core program files relating to the operating system. It may also be capable of operating in a user mode, in which certain operations are prevented, such as access to those core program files.

Generally, applications that are executed while the computing system is operating with a high level of privilege should have been subjected to a rigorous auditing process to ensure that they operate as intended and do not risk destabilizing the operating system. Furthermore, the code must come from a reliable source. Indeed, it must not be possible for such applications to corrupt certain isles relating to correct functioning of the operating system or permit data to be accessed fraudulently.

In some cases it would be desirable that certain software applications that have not been subjected to the rigorous auditing process be executable from the privileged operating mode. However, there is a technical problem in permitting such an execution without compromising the security of the computing system. Furthermore, there is a need in the art for a computing system providing added security for sensitive data such as cryptographic keys.

SUMMARY

It is an aim of embodiments of the present disclosure to at least partially address one or more details in the prior art.

According to one aspect, there is provided a method of protecting sensitive data comprising: entering, by a processing device, a sensitive data access mode in which sensitive data is accessible; restricting, by a program running in the sensitive data access mode, one or more accessible address ranges for a non-secure function, and calling, from the sensitive data access mode, the non-secure function; and entering, by the processing device, a further operating mode to execute the non-secure function during which the processing device has access to only the one or more accessible address ranges.

According to one embodiment, the method further comprises storing in the one or more accessible address ranges, by the program running in the sensitive data access mode, input data to be processed during execution of the non-secure function.

According to one embodiment, restricting the one or more accessible address ranges for the non-secure function comprises configuring, in one or more configuration registers of a memory protection circuit, the one or more accessible address ranges.

According to one embodiment, the method further comprises: receiving, by the memory protection circuit during execution of the non-secure function, an address to be accessed; comparing the address to be accessed with the one or more accessible address ranges; and triggering the memory access only if the address to be accessed is within the one or more accessible address ranges.

According to one embodiment, the method further comprises defining in a register a stack pointer pointing to call parameters stored in the one or more accessible address ranges and to be used by the non-secure function.

According to one embodiment, the method further comprises executing the non-secure function in the further operating mode by fetching instruction code from an instruction code memory.

According to one embodiment, the instruction code stored in the instruction code memory is encrypted, the method further comprising decrypting the instruction code.

According to one embodiment, the instruction code is decrypted by a decryption circuit using a first key associated with the further operating mode, and the instruction code memory further stores further instruction code associated with the sensitive operating mode and capable of being decrypted using a second key different to the first key, wherein the decryption circuit is configured to render the second key accessible only while the processing device is in the sensitive data access mode.

According to one embodiment, the method further comprises returning to the sensitive data access mode upon termination of the sandboxed function call.

According to one embodiment, the termination of the sandboxed function call is triggered by an event external to the processing device.

According to one embodiment, the termination of the sandboxed function call is triggered by at least one of: the detection, by a memory protection circuit, of an attempt to access an address outside the one or more accessible address ranges; the detection of an attempt to access a forbidden peripheral device; the detection of an attempt to access a forbidden register; the detection of an attempt to access an unknown or forbidden instruction; and the detection of an interrupt generated by a peripheral device.

According to a further aspect, there is provided a computing system comprising: a processing device capable of operating in a sensitive data access mode in which sensitive data is accessible, and in a further mode, the processing device being configured to: restrict, by a program running in the sensitive data access mode, one or more accessible address ranges for a non-secure function; call, from the sensitive data access mode, the non-secure function; and enter the further operating mode to execute the non-secure function daring which the processing device has access to only the one or more accessible address ranges.

According to one embodiment, the computing system further comprises a decryption circuit configured to decrypt instruction code of the non-secure function prior to its execution by the processing device.

According to one embodiment, the computing system further comprises: an instruction code memory storing the instruction code and further instruction code associated wife the sensitive operating mode; and a decryption circuit adapted to decrypt the instruction code using a first key associated with the further operating mode, and decrypt the further instruction code using a second key different to the first key, the decryption circuit being configured to render the second key accessible only while the processing device is in the sensitive data access mode.

According to one embodiment, the processing device is configured to terminate the sandboxed function call in response to an interrupt generated in response to the detection of one or more of: an attempt to access an address outside the one or more accessible address ranges; an attempt to access a forbidden peripheral device; an attempt to access a forbidden register; an attempt to access an unknown or forbidden instruction; and an interrupt generated by a peripheral device.

BRIEF DESCRIPTION OF THE DRAWINGS

The foregoing and other features and advantages, either alone or in combinations of two or more, and the manner of attaining them, will became apparent from the following detailed description of embodiments, given by way of illustration and not limitation with reference to the accompanying drawings, in which.

Corresponding reference characters indicate corresponding parts throughout the several views. Although the drawings represent embodiments of the present invention, the drawings are not necessarily to scale and certain features may be exaggerated in order to better illustrate and explain the full scope of the present invention. The flow charts and screen shots are also representative in nature, and actual embodiments of the invention may include further features or steps not shown in the drawings. The exemplification set out herein illustrates an embodiment of the invention, in one form, and such exemplifications are not to be construed as limiting the scope of the invention in any manner.

DETAILED DESCRIPTION

The embodiments disclosed below are not intended to be exhaustive or limit the invention to the precise form disclosed in the following detailed description. Rather, the embodiments are chosen and described so that others skilled in the art may utilize its teachings.

Figure 1:
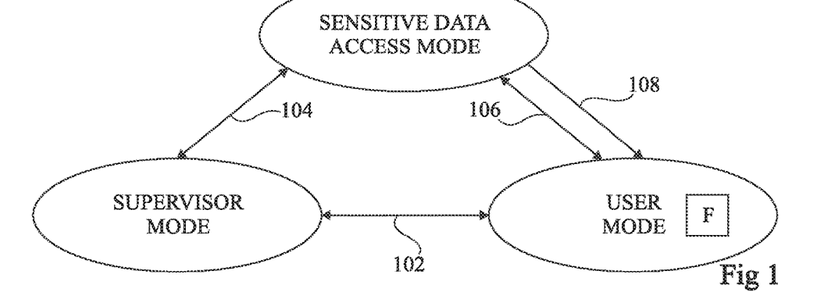
FIG. 1 is a state diagram representing operating modes of a processing device according to an example embodiment.

FIG. 1 is a state diagram representing operating modes of a computer processing device according to one example embodiment. In the example of FIG. 1, the processing device is capable of operating in one of three available operating modes, a user mode (USER MODE), a supervisor mode (SUPERVISOR MODE) and a sensitive data access mode (SENSITIVE DATA ACCESS MODE).

The computer processing device for example implements a form of ring-based security in which there is a hierarchy of privileges among the operating modes. For example, in the system of FIG. 1, the user mode has the least privileges, the supervisor mode has increased privileges with respect to the user mode, and the sensitive data access mode has yet increased privileges with respect to the supervisor mode.

Certain operations that could damage or compromise the computing system are for example blocked in the user mode, and the supervisor mode must for example be called from the user mode in order to execute such operations. Furthermore, certain operations involving sensitive data are for example blocked in the user and supervisor modes, and the sensitive data access mode must for example be called from either of the lower privileged modes in order to for such operations to be executed.

Each of the operating modes is associated with dedicated instruction code that may only be executed from the corresponding operating mode, although a sandboxed function call is described hereafter permitting code of a low privileged operating mode to be called from a higher privileged operating mode.

While the processing device is in the user mode, certain operations may for example be executed, but other operations are blocked. Furthermore, critical peripheral devices, such as timers, analog to digital converters, serial interfaces, etc., cannot for example be accessed directly. Parts of the memory are also inaccessible, such that sensitive data cannot be read or modified. The term "sensitive data" is used herein to designate any data to which access should be restricted, and includes for example boot routines executed during a boot sequence of the processing device, cryptographic keys, routines that perform cryptographic operations, etc. The applications that may be executed while the processing device is in the user mode are for example applications that cannot access sensitive data.

While the processing device is in the supervisor mode, all operations that are permitted to be executed in the user mode may, for example be executed, and all regions of memory that are accessible in the user mode are also accessible. Furthermore, one or more further operations may be executed that could not be executed in the user mode, and/or one more memory regions may be accessed that could not be accessed in the user mode. For example, the operating system, drivers and/or system calls are executable in the supervisor mode.

While the processing device is in the sensitive data access mode, all operations permitted in the user and supervisor modes are for example permitted, and additionally sensitive data, and/or operations involving sensitive data, may be accessed and/or executed. In order to protect, during the program development, the code executable and data accessible from the sensitive data access mode, only authorized program developers are for example permitted to modify the contents of the programs of the sensitive data access mode, and access a debugger having the same privileges as the sensitive data access mode programs. Other users are for example only able to write code that contains calls to the sensitive data access mode, but cannot obtain information on the functioning of the sensitive data access mode program, or access the assembler code of this program, or access the memory content that is accessed by this program. As described in more detail below, the access protection is for example implemented in various forms depending on the context, and may include verification of a password and/or an activation key.

The operating modes of the processing device are for example implemented by hardware protection mechanisms that ensure that data and programs may only be accessed from permitted operating modes. For example, such hardware mechanisms are described in more detail in the publication by M. D. Schroeder and J. H. Saltzer entitled "A Hardware Architecture for Implementing Protection Rings", available from the internet site http://www.multicians.org/protection.html, the contents of which is hereby incorporated by reference to the extent permitted by the law. The memory access protection for example relies on a memory management unit (MMU), that will be configured from one or more of the highest priority modes, such as the supervisor mode or the sensitive data access mode, to either protect segments of memory and/or conceal them using address translation.

Arrows between the operating modes in FIG. 1 represent transitions that may be made from one mode to another. It is for example possible to directly enter any of the modes from any other mode.

As represented by the arrow 102, the processing device may switch between the supervisor mode and the user modes, for example via a system call, or by an interrupt during a context switch.

The interrupt is for example triggered by a peripheral and provided to the processing device, which causes the processing device to switch operating modes to execute the corresponding interrupt handler. Once the interrupt handler has finished executing, the processor returns to the previously active mode and routing. For example, the interrupt could be triggered by the expiration of a timer, or by a serial communication peripheral when data is received or is ready to be sent, or by any other peripheral adapted to notify the processor of an event. In some embodiments, interrupts are also triggered programmatically from a program in the user mode.

The system call involves the execution in the user mode of an instruction that permits the mode to change to the supervisor mode to execute the system call routine. For example, the system call is a software interrupt, the interrupt handler decoding, verifying and executing the code of the software interrupt. This routine checks that the caller, which is for example a task executed in the user mode, is allowed to perform the call, and if not, rejects the query. The routine then performs the associated operations, such as allocating memory or access to a peripheral for the calling process, and switches back to the user mode to continue execution of the caller task.

The context switch is used to share execution cycles between user mode tasks, and comprises an interrupt routine that is executed in the supervisor mode and generally triggered by a timer peripheral. This interrupt routine for example saves the context of the currently running task, uses a scheduling algorithm to define the next active process, restores the process's context, and returns the processor to the user mode to execute this process.

As represented by arrows 104 and 106 in FIG. 1, the sensitive data access mode may be accessed from either the supervisor mode or the user mode. In either case, this transition is for example accomplished by the execution of a specific call associated with the sensitive data access mode, by a secure interrupt, or by a security exception. The specific call, which is for example a sensitive data access mode call, for example involves the execution of an instruction that permits this change in mode. An exception is a special type of interrupt triggered by an internal event in the processor. A simple example of an exception is one that occurs when the processor attempts to execute an incorrect program, such as one that is not encoded correctly with respect to the instruction set.

In some embodiments, interrupts are rendered secure by permitting the operating system to only configure interrupts dedicated to peripheral devices, and not those relating to the sensitive data access mode, which for example have the highest priority. The priority level of interrupts is for example managed by configuration registers that may for example only be written from the sensitive data access mode.

As represented by an arrow 108 in FIG. 1, in some embodiments one or more functions (F) of the user mode may be called and executed from the sensitive data access mode. In order to ensure security during the execution of these functions, they are for example called using what will be referred to herein as "sandboxed" function calls. For example, such a sandboxed call is made using a specific instruction of the instruction set of the processing device, this instruction causing the privilege level to the temporarily degraded, with a corresponding restriction on memory accesses, so that the non-secure function may be executed in a secure fashion, for example in the user mode or in a dedicated sandbox mode. In particular, a sandboxed function call for example permits the execution of functions containing non-secure routines while ensuring security, and thereby allowing results returned from the execution of these functions to be accessed and used within the sensitive data access mode. For example, the functions of the user mode to be executed from the sensitive data mode could include standard libraries, such as mathematical libraries, or cryptographic algorithms, which have not been audited for use in the sensitive data access mode. Such functions will be referred to herein as non-secure functions.

The sandboxed call permits the execution of the function to be isolated, and to confine its operation to a limited memory space for both read and write operations. This memory space is reserved for the sensitive data access mode, and for example prohibits access to peripheral devices, which ensures that such devices could not access data outside the sandboxed function, nor transmit data outside the processing device.

For example, during a sandboxed call, control is passed back to the sensitive data access mode program if one or more of the following events occur:

the called function terminates correctly;

a security interrupt is triggered, such as an external security exceptions, where a peripheral device detects an attack such as a fault injection, or an internal security exception, triggered for example by the execution of incorrect code by the processing device, or a forbidden access to memory or to a peripheral;

the sandboxed function attempts to perform a prohibited operation, such as: accessing a memory address outside the sandboxed zone; performing a system call; or accessing a peripheral device;

an interrupt is triggered before the sandboxed function terminates. For example, such a mechanism permits a limited time to be allocated to the sandboxed call using a peripheral device such as a watchdog timer.

An advantage of such a sandboxed call is that it permits non-secure functions that have not been audited for use in the sensitive data access mode to be called from the sensitive data access mode without introducing a security risk. Furthermore, it permits the overall memory footprint of the program to be reduced by using the same implementation of common functions in the user mode and in the sensitive data access mode. In other words, it avoids the duplication of common code between the secure and insecure execution spaces.

While in the example of FIG. 1 the processing device is capable of operating in three operating modes, in alternative embodiments, there is at least a sensitive data access mode, and one or more further modes of lower privilege. For example, in some embodiments only a user mode and the sensitive data access mode are supported.

Figure 2:
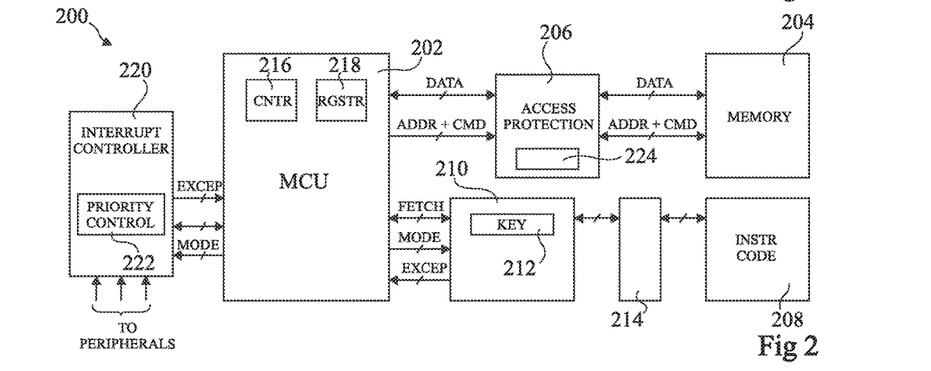
FIG. 2 schematically represents a computing system having an access protection circuit according to an example embodiment of the present disclosure.

FIG. 2 schematically illustrates a computing system 200 having an access protection circuit according to an example embodiment.

As illustrated, the computing system for example comprises a processing device (MCU) 202, which is for example a microcontroller unit. The processing device 202 for example comprises one or more processors configured to execute instruction code. The processing device 202 for example communicates with a memory (MEMORY) 204, which is for example a RAM (Random Access Memory) such as an SRAM (Static RAM) or DRAM (Dynamic RAM). The interface between the processing device 202 and the memory 204 comprises an access protection circuit (ACCESS PROTECTION) 206. The circuit 206 is for example implemented by an MPU (memory protection unit) or MMU (memory management unit), and is coupled between data (DATA) and address/command (ADDR+CMD) lines of the processing device, and data and address/command lines of the memory 204.

Furthermore, the processing device 202 is for example coupled to an instruction memory (INSTR CODE) 208 via a further access protection circuit 210. In some embodiments, this circuit 210 protects the access to instruction code stored in the memory 208 and/or provides cryptographic protection of the code stored in the memory 208. For example, the circuit 210 decrypts instructions fetched from the memory 208 based on one or more keys stored by the circuit 210, for example in a secure register 212. In some embodiments, the circuit 210 is configured to activate different keys for different operating modes, such that only code associated with the current operating mode may be fetched and executed. The circuit 210 for example receives a signal MODE from the MCU 202 indicating the current operating mode, such that the appropriate key is activated. If the MCU 202 attempts to fetch and execute code associated with a different operating mode from its current mode, an incorrect key will be applied by the circuit 210, creating an exception, which is for example communicated to the MCU 202 and causes the current operation to terminate.

In some embodiments, a cache controller 214 is provided for interfacing with the memory 208. In one example shown in FIG. 2, the cache controller 214 is positioned between the circuit 210 and the instruction code memory 208, although it could be positioned elsewhere. The cache controller for example stores lines of instruction code equal to or greater in length than the block size used during the decryption. The cache controller 214 thus aids the decryption operation by storing appropriate sized blocks of code for decryption.

The processing device 202 for example comprises a counter (CNTR) 216, and one or more registers (RGSTR) 218.

When a user mode function is to be called from the sensitive data access mode, a specific instruction, which will be called herein "USER_MODE_CALL", is used. The instruction for example indicates the address of the function that is to be executed. The register 218 is for example a special function register that stores a status "UFCALL_STATUS" associated with USER_MODE_CALL, and in particular stores the result of the call. For example, possible values of this register, and their corresponding meanings, are as follows:

UFCALL_OK: the function call has terminated correctly;
UFCALL_ERR_INSTRUCTION: the sandboxed function attempted to execute a forbidden or unknown instruction;
UFCALL_ERR_MEMORY: the sandboxed function attempted to access an address in a forbidden address range;
UFCALL_ERR_SFR: the sandboxed function attempted to access a forbidden special function register (SFR);
UFCALL_INTERRUPT: an interrupt occurred before the end of the function call, wherein the interrupt has been processed and the function call interrupted.

During execution of the function call, the counter 216 is for example used to trace further function calls. For example, the counter is initialized at 1, and is incremented on each further function call, and decremented upon termination of each function call. The counter falls to 0 when the sandboxed function call terminates, and the processing device then for example returns to the sensitive data access mode, and jumps to the instruction following the USER_MODE_CALL instruction.

It should be noted that the user mode and the sensitive data access mode do not for example use the same return registers (RTR), which locally store the return address of the functions. Thus the sandboxed function is not able to alter the return address of the function call. In this way, it is not possible for non-audited code to be executed in the sensitive data access mode.

The processing device 202 is also for example coupled to one or more peripheral devices (TO PERIPHERALS), via an interrupt controller (INTERRUPT CONTROLLER) 220, which in alternative embodiments could be integral with the processing device 202. The peripherals for example comprise devices such as timers, analog to digital converters (ADCs), digital to analog converters (DACs), pulse width modulators, serial interfaces, such as I2C, SPI (serial peripheral interface) or UART (universal asynchronous receiver/transmitter) interfaces, sensors, etc. The interrupt controller 220 for example receives interrupts from the peripherals on respective input lines, and also an indication of the current mode from the processing device. The interrupt controller 220 for example comprises a priority control circuit 222, which for example manages priority levels among the interrupts, and is for example reconfigurable by the processing device when it is in the sensitive data access mode.

The access protection circuit 206 is for example an MMU (memory management unit) configured to restrict, during a sandboxed function call from the sensitive data access mode, the range of memory addresses that are accessible by the memory 204. For example, the circuit 206 comprises a configuration register 224 accessible by the processing device 202 while the processing device is operating in the sensitive data access mode. Before the sandboxed function call and while the processing device 202 is in the sensitive data access mode, it for example sets one or more address ranges in the configuration register 224 in order to limit, during the sandboxed function call, the address ranges of the memory 204 that may subsequently be accessed by the processing device 202 while operating in the user mode. For example, the address ranges accessible during the sandboxed call are limited to certain address ranges among those associated with the sensitive data access mode.

The circuit 206 for example compares each address of a read or write request from the processing device 202 with the one or more permitted address ranges defined by the configuration register 218, and relays the read or write request to the memory 204 only if the address is in a permitted range.

At the end of the sandboxed call, the processing device 202 for example returns to the sensitive data access mode and reconfigures the register 224 such that all address ranges associated with the sensitive data access mode are again accessible.

Figure 3A:
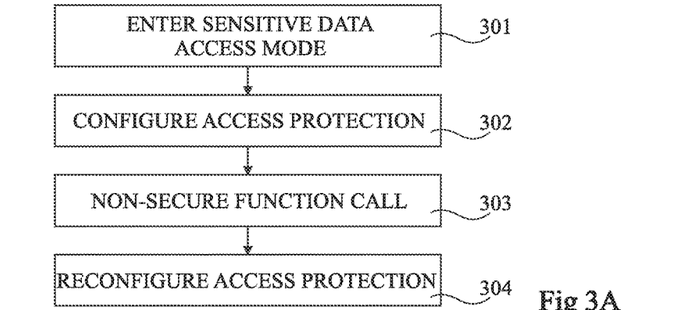
FIG. 3A is a flow diagram illustrating operations in a method of performing a non-secure function call from a sensitive data access mode according to an example embodiment.

FIG. 3A is a flow diagram illustrating operations in a method of performing a non-secure function call from a sensitive data access mode according to an example embodiment. These operations are for example implemented by the processing device 202 of FIG. 2, under control of instruction code fetched from the memory 208.

In an operation 301, the sensitive data access mode is entered, for example using one of the mechanisms discussed above in relation to FIG. 1.

In an operation 302, when a non-secure function is to be called, access protection to the memory address space of the processing device is restricted. This operation is for example performed by configuring the register 224 in FIG. 2 to restrict the accessible memory addresses to a certain address range associated with the sensitive data access mode.

In an operation 303, a function call is made to the non-secure function, such as a function that is only permitted to be executed in a user mode. The operating mode thus switches to the user mode or to another mode suitable for execution of the called function, so that the instruction code associated with the non-secure function may be accessed and executed. However, the function call is sandboxed, meaning that because the calling program of the sensitive data access mode has set, in the operation 302, a permitted address range in the configuration register 224, the addresses that will be accessible during execution of the function are restricted.

In a subsequent operation 304, after the called function has ended, or when the sandboxed function has been left for another reason such as a security exception, the processing device for example returns to the sensitive data access mode, and reconfigures the register 224 of the protection circuit 206 based on the address ranges normally accessible from the sensitive data access mode. This operation is for example performed by reconfiguring the register 224 in FIG. 2.

Figure 3B:
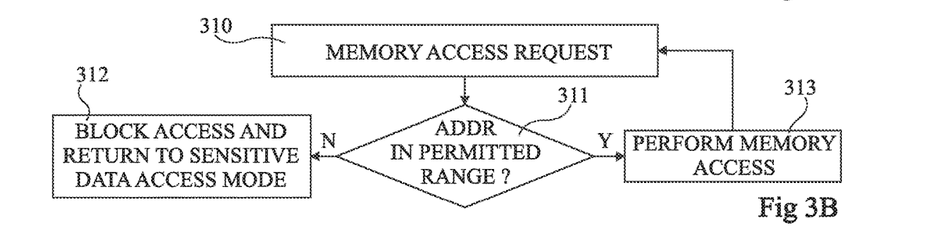
FIG. 3B is a flow diagram illustrating operations for handling memory access requests during a non-secure function call according to an example embodiment.

FIG. 3B is a flow diagram representing operations in a method of restricting memory access during a sandboxed function call according to an example embodiment. These operations are for example performed by the access protection circuit 206 of FIG. 2.

In an operation 310 during the execution of the called function, a memory access request is generated, which may be a read or write operation. This memory access request is for example received by the access protection circuit 206 from the processing device 202.

In an operation 311, it is determined by the access protection circuit 206 whether the memory address requested to be accessed is in a permitted range, defined for example by data stored in the configuration register 224. If so, the memory access is allowed in an operation 313, and the method returns to operation 310 for a next memory access operation. Alternatively, if the address is not in a permitted range, in an operation 312 the memory access is blocked by the access protection circuit 206. In such a case, control is for example returned to the program in the sensitive data access mode.

Figure 4:
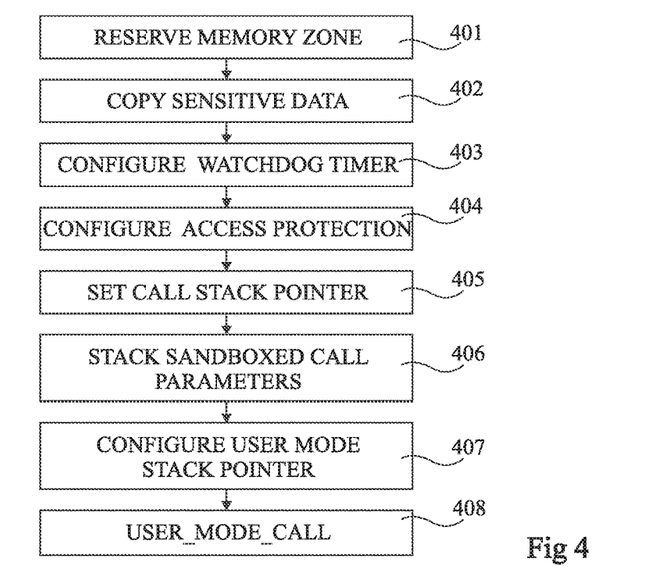
FIG. 4 is a flow diagram illustrating operations leading up to a non-secure function call from a sensitive data access mode in more detail according to an example embodiment.

FIG. 4 is a flow diagram illustrating operations leading up to a sandboxed function call according to an example embodiment.

In an operation 401, a memory zone, for example in the memory 204, is reserved for the execution of the sandboxed function, and assigned for this purpose by the program running in the sensitive data access mode.

In a subsequent operation 402, input data is for example copied to the reserved memory zone, this data providing the inputs to the called function. This operation could in some embodiments be performed by the program executed in the sensitive data access mode, which for example designates address ranges of the sensitive data access mode that already contain the input data to the called function, thereby avoiding the cost of a memory copying step.

In a subsequent operation 403, a peripheral device "watchdog timer" is for example configured to limit the execution time of the function. This watchdog timer is for example a timing circuit adapted to assert an interrupt after a certain time duration. An advantage of limiting the execution time of the function in this way is that the unverified code of the called function could loop, thereby freezing the system unless a timer system is in place.

A subsequent operation 404 for example corresponds to the operation 302 of FIG. 3A, in which the memory protection circuit 206 is configured in order to restrict access to the reserved zone of memory in the user mode. In a subsequent operation 405, a call stack pointer is for example initialised. The call stack pointer is for example implemented by a general purpose register in the processing device 202, and is for example assigned a value at the end of the reserved zone in the memory, such that if the stack extends outside the authorized zone, this may be detected by the status UFCALL_ERR_MEMORY of the SFR register as described above.

In a subsequent operation 406, the sandboxed call parameters are for example stacked using the register defined above. When the stacked parameters comprise pointers, the address translation is also taken into account. In this way, the sandboxed call is for example prevented from knowing the absolute address ranges it is accessing. For example, the sandboxed memory area starts at a given absolute address, such as the address "100". However, the sandboxed function believes this to be the address "0". If a pointer is passed to a variable located at an absolute address of "250", this address will be translated to a value of "150" for the sandboxed function, in other words the absolute address "250" of the pointer, minus the start address "100".

In a subsequent operation 407, the user mode stack pointer is for example configured to point to the reserved space in the stack in this memory zone, while taking into account any address translation if appropriate.

In an operation 408, the user mode function is then called by the instruction "USER_MODE_CALL".

The following code, provided as a mix of pseudo-code, C and assembler, provides an example of a sandboxed function call relating to a decryption function. In this code, "key" is a buffer of size key_size containing the decryption key, and "ciphered" is a buffer of size ciphered_size containing the data to be decrypted. It is assumed that the program running in the sensitive data access mode is to recover the decrypted data and its size.

```
           // Reservation of the memory zone
           // The memory zone reserved for the call is the address range 0x8000 to
0x9000
           // The called function sees the reserved memory zone as starting from the
address 0x0000
           key_sdb = 0x8000;
           ciphered_sdb = key_sdb + key_size;
           data_sdb = ciphered_sdb + ciphered_size;
           // Copying of input data
           memcpy(key_sdb, key, key_size)
           memcpy(ciphered_sdb, ciphered, ciphered_size)
           // Configuration of the MMU
           configure_mmu(USER_MODE,/*loc=*/0x8000,/*size=*/0x1000,
/*offset=*/0x8000)
           // Configuration of a watchdog timer
           start_watchdog(10000)
           // Creation of the stack
           MOV DR52, 0x8900
           MOV DR0, key_sdb - 8000       // Parameter 1 : key address as seen by
the sandboxed function
           MOV DR4, key_size      // Parameter 2 : size of the key (unchanged)
           MOV DR8 ciphered_sdb - 0x8000     // Parameter 3 : address of the
encrypted data as seen by the sandboxed function
           MOV @DR52++, ciphered_size         // Parameter 4 : size of the
encrypted data
           MOV @DR52++, data_sdb - 0x8000    // Parameter 5 : destination
address as seen by the sandboxed function
           // Call of the function
           USER_CALL decipher
           // Verification of the output status
           if (   UFCALL_STATUS == UFCALL_OK
              || (UFCALL_STATUS == UFCALL_INTERRUPT &&
!watchdog_timeout( ))) {
           // OK
           } else {
           // Error
           }
```

Figure 5A:
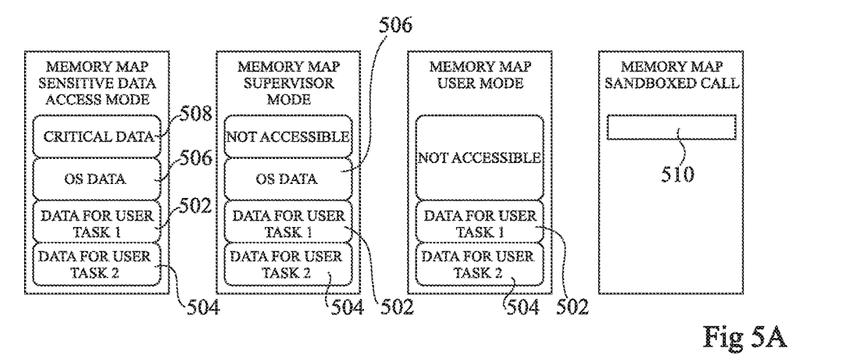
FIG. 5A schematically illustrates memory maps of operating modes of the computing system of FIG. 2 according to an example embodiment in which the computing system comprises a memory protection unit.

FIG. 5A schematically illustrates the memory maps available in the computing system 200 of FIG. 2 during the sensitive data access mode, the supervisor mode, the user mode and the sandboxed function call, according to an example embodiment, assuming that the access protection circuit 202 of FIG. 2 is a memory protection unit (MPU).

In the illustrated example, in the user mode, only first data (DATA FOR USER TASK 1) 502 and second data (DATA FOR USER TASK 2) 504 is accessible. In the supervisor mode, not only is the data 502 and 504 accessible, but also operating system OS data (OS DATA) 506 is accessible, where the OS data corresponds to the internal data structures of the OS, such as description of the tasks, signals, semaphores, etc. In the sensitive data access mode, not only is the data 502, 504 and 506 accessible, but also critical data (CRITICAL DATA) 508, which for example represents sensitive data held by the system, such as encryption keys, boots time routines, etc. During the sandboxed function call, a portion 510 of this critical data 508 is for example accessible, but no other data is accessible, such that the called function is for example unable to transfer data to other non-authorized zones of the memory.

Figure 5B:
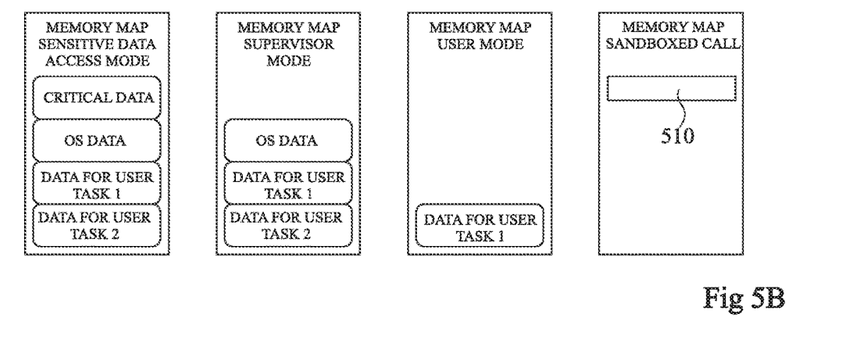
FIG. 5B schematically illustrates memory maps of the operating modes of the computer system of FIG. 2 according to a further example embodiment in which the computing system comprises a memory management unit.

FIG. 5B illustrates a case similar to that of FIG. 5A, but in this case the access protection circuit is a memory management unit that is able to perform address translation in addition to access protection. Thus information of memory areas that are only accessible to higher privileged modes are hidden, and thus do not exist from the tasks point of view.

An advantage of the embodiments described herein is that, by permitting non-secure functions to be called from the sensitive data access mode, and by restricting the accessible address range during execution of this call, such functions may be used during the sensitive data access mode without compromising security.

Having thus described at least one illustrative embodiment, various alterations, modifications and improvements will readily occur to those skilled in the art. For example, it will be apparent to those skilled in the art that while a processing device is described having three operating modes, in alternative embodiments there could be any number of operating modes.

The invention claimed is:

1. A method of protecting sensitive data comprising:
   entering, by a processing device, a sensitive data access mode in which sensitive data is accessible;
   restricting, by a program running in the sensitive data access mode, one or more accessible address ranges for a non-secure function, and calling, from the sensitive data access mode, the non-secure function; and
   entering, by the processing device, a second operating mode to execute the non-secure function, the second operating mode being different from the sensitive data access mode, wherein during the second operating mode the processing device has access to only the one or more accessible address ranges.

2. The method of claim 1, further comprising storing in the one or more accessible address ranges, by the program running in the sensitive data access mode, input data to be processed during execution of the non-secure function.

3. The method of claim 1, wherein restricting the one or more accessible address ranges for the non-secure function comprises configuring, in one or more configuration registers of a memory protection circuit, the one or more accessible address ranges.

4. The method of claim 3, further comprising:
receiving, by the memory protection circuit during execution of the non-secure function, an address to be accessed;
comparing the address to be accessed with the one or more accessible address ranges; and
triggering the memory access only if the address to be accessed is within the one or more accessible address ranges.

5. The method of claim 1, further comprising defining in a register a stack pointer pointing to call parameters stored in the one or more accessible address ranges and to be used by the non-secure function.

6. The method of claim 1, further comprising executing the non-secure function in the second operating mode by fetching instruction code from an instruction code memory.

7. The method of claim 6, wherein the instruction code stored in the instruction code memory is encrypted, the method further comprising decrypting the instruction code.

8. The method of claim 7, wherein the instruction code is decrypted by a decryption circuit using a first key associated with the second operating mode, and wherein the instruction code memory further stores further instruction code associated with the sensitive operating mode and capable of being decrypted using a second key different to the first key, wherein the decryption circuit is configured to render the second key accessible only while the processing device is in the sensitive data access mode.

9. The method of claim 1, further comprising returning to the sensitive data access mode upon termination of the non-secure function.

10. The method of claim 9, wherein the termination of the non-secure function is triggered by an event external to the processing device.

11. The method of claim 9, wherein the termination of the non-secure function is triggered by at least one of:
the detection, by a memory protection circuit, of an attempt to access an address outside the one or more accessible address ranges;
the detection of an attempt to access a forbidden peripheral device;
the detection of an attempt to access a forbidden register;
the detection of an attempt to access an unknown or forbidden instruction; and
the detection of an interrupt generated by a peripheral device.

12. A computing system comprising:
a processing device capable of operating in a sensitive data access mode in which sensitive data is accessible, and in a second operating mode, the second operating mode being different from the sensitive data access mode, the processing device being configured to:
restrict, by a program running in the sensitive data access mode, one or more accessible address ranges for a non-secure function;
call, from the sensitive data access mode, the non-secure function; and
enter the second operating mode to execute the non-secure function during which the processing device has access to only the one or more accessible address ranges.

13. The computing system of claim 12, further comprising a decryption circuit configured to decrypt instruction code of the non-secure function prior to its execution by the processing device.

14. The computing system of claim 12, further comprising:
an instruction code memory storing the instruction code and further instruction code associated with the sensitive operating mode; and
a decryption circuit adapted to decrypt the instruction code using a first key associated with the second operating mode, and decrypt the further instruction code using a second key different to the first key, wherein the decryption circuit is configured to render the second key accessible only while the processing device is in the sensitive data access mode.

15. The computing system of claim 12, wherein the processing device is configured to terminate the non-secure function in response to an interrupt generated in response to the detection of one or more of:
an attempt to access an address outside the one or more accessible address ranges;
an attempt to access a forbidden peripheral device;
an attempt to access a forbidden register;
an attempt to access an unknown or forbidden instruction; and
an interrupt generated by a peripheral device.

* * * * *